US012629766B2

(12) United States Patent
Xue et al.

(10) Patent No.: US 12,629,766 B2
(45) Date of Patent: May 19, 2026

(54) CARBON STEEL AND AUSTENITIC STAINLESS STEEL ROLLING CLAD PLATE MANUFACTURING METHOD THEREFOR

(71) Applicant: BAOSHAN IRON & STEEL CO., LTD., Shanghai (CN)

(72) Inventors: Peng Xue, Shanghai (CN); Xiaodong Zhu, Shanghai (CN); Bo Yan, Shanghai (CN); Sihai Jiao, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 916 days.

(21) Appl. No.: 17/780,598

(22) PCT Filed: Nov. 27, 2020

(86) PCT No.: PCT/CN2020/132056
§ 371 (c)(1),
(2) Date: May 27, 2022

(87) PCT Pub. No.: WO2021/104417
PCT Pub. Date: Jun. 3, 2021

(65) Prior Publication Data
US 2023/0001504 A1    Jan. 5, 2023

(30) Foreign Application Priority Data
Nov. 29, 2019    (CN) .......................... 201911196554.2

(51) Int. Cl.
| | |
|---|---|
| B23K 20/04 | (2006.01) |
| B21B 1/38 | (2006.01) |
| C21D 8/0221 | (2026.01) |
| C21D 8/0247 | (2026.01) |
| C22C 38/00 | (2006.01) |
| C22C 38/02 | (2006.01) |
| C22C 38/04 | (2006.01) |
| C22C 38/06 | (2006.01) |
| C22C 38/42 | (2006.01) |
| C22C 38/44 | (2006.01) |
| C22C 38/58 | (2006.01) |

(52) U.S. Cl.
CPC ............... *B23K 20/04* (2013.01); *B21B 1/38* (2013.01); *C21D 8/0236* (2013.01); *C21D 8/0273* (2013.01); *C22C 38/001* (2013.01); *C22C 38/02* (2013.01); *C22C 38/04* (2013.01); *C22C 38/06* (2013.01); *C22C 38/42* (2013.01); *C22C 38/44* (2013.01); *C22C 38/58* (2013.01); *B21B 2001/386* (2013.01); *C21D 2211/001* (2013.01)

(58) Field of Classification Search
CPC ..... C22C 38/001; C22C 38/002; C22C 38/02; C22C 38/04; C22C 38/06; C22C 38/12; C22C 38/14; C22C 38/22; C22C 38/28; C22C 38/38; C22C 38/40; C22C 38/42; C22C 38/44; C22C 38/58
See application file for complete search history.

(56) References Cited

FOREIGN PATENT DOCUMENTS

| | | | | |
|---|---|---|---|---|
| CN | 1095989 | A | 12/1994 | |
| CN | 104988414 | A | 10/2015 | |
| CN | 105296854 | A | 2/2016 | |
| CN | 107419066 | A | 12/2017 | |
| CN | 108504956 | A | 9/2018 | |
| CN | 109203604 | A | 1/2019 | |
| CN | 109290372 | A | 2/2019 | |
| EP | 0355046 | A2 | 2/1990 | |
| JP | S62110879 | A | 5/1987 | |
| JP | H05255758 | A | 10/1993 | |
| JP | 5352766 | B2 | 11/2013 | |
| JP | 2019007056 | A | 1/2019 | |
| KR | 20180075621 | A * | 7/2018 | ............. B32B 15/01 |
| WO | 2019/219031 | A1 | 11/2019 | |
| WO | WO 2020/071343 | * | 4/2020 | ............. C22C 38/00 |

OTHER PUBLICATIONS

EP Search Report dated Apr. 11, 2023 for EP 20894434.8.
JP Office Action dated Jul. 4, 2023.
Chernyshev et al., "Structure and properties of cladmaterial", Zashchitnye Porkrytiya Na Matellakh, vol. 7, Jan. 1, 1973, pp. 203-206, XP009543450, ISSN: 0514-5864, the whole documemt.
International Search Report for PCT/CN2020/132056 dated Feb. 25, 2021.
International Written Opinion for PCT/CN2020/132056 dated Feb. 25, 2021.

* cited by examiner

*Primary Examiner* — Lois L Zheng
(74) *Attorney, Agent, or Firm* — Lei Fang, Esq.; Smith Tempel Blaha LLC

(57) ABSTRACT

Disclosed in the present invention is a manufacturing method for a carbon steel and austenitic stainless-steel rolling clad plate, comprising the steps of: (1) obtaining a blank material of a carbon steel layer and a blank material of a stainless-steel layer; (2) assembling blank materials; (3) cladding and rolling; (4) cold rolling; (5) first annealing; and (6) second annealing. The carbon steel and austenitic stainless-steel rolling clad plate has two unique annealing processes, so that the clad plate has the performance advantages of the austenitic stainless-steel and the carbon steel. In addition, further disclosed in the present invention is a carbon steel and austenitic stainless-steel rolling clad plate manufactured by this method.

17 Claims, No Drawings

CARBON STEEL AND AUSTENITIC STAINLESS STEEL ROLLING CLAD PLATE MANUFACTURING METHOD THEREFOR

CROSS-REFERENCE TO RELATED APPLICATIONS

This application is a 371 U.S. National Phase of PCT International Application No. PCT/CN2020/132056 filed on Nov. 27, 2020, which claims benefit and priority to Chinese patent application No. CN 201911196554.2 filed on Nov. 29, 2019, the contents of each of the above listed applications are incorporated by reference herein in their entiries.

TECHNICAL FIELD

The present disclosure relates to a steel plate and a manufacturing method therefor, in particular to a steel plate having an austenitic stainless-steel layer and a manufacturing method therefor.

BACKGROUND ART

In the past decade, structural steel, especially automotive structural steel, has been widely used, among which high-strength automotive structural steel has become the main product for automobile weight reduction and strength upgrade of structural parts. Different structures and performances of structural steel are mainly obtained through the control of different production processes. Structural steel mainly includes precipitation reinforced steel, martensitic steel, dual-phase steel, TRIP steel (QP steel) and multi-phase steel, etc., of which the strength covers different strength grades of 780 MPa-1700 MPa. 780 MPa-1180 MPa grade cold-rolled high-strength structural steel has a considerable application results, but during the procedure in use, there are still some shortcomings in its use performance that need to be solved.

As a kind of carbon steel, ultra-high strength steel has lower surface corrosion resistance than stainless-steel. A special phosphorization coating process or the addition of plating at the factory is required to increase corrosion resistance. These additional processes result in increased costs. Moreover, with the improvement of the strength of high-strength steel, the added amount of alloying elements continues to increase, and the surface enrichment of alloying elements in the manufacturing process will affect the phosphorization coating performance and plating ability, which is not conducive to the production of high-strength steel plates having corrosion resistance. Therefore, the present disclosure provides a carbon steel +austenitic stainless-steel rolled clad plate, which has an austenitic stainless-steel layer and a high-strength carbon steel layer that provides a different specific mechanical properties for the overall steel plate at the same time.

Austenitic stainless-steel has a very good performance in corrosion resistance, heat resistance, low temperature strength and mechanical properties, meanwhile, its processability such as stamping and bending is good, and there is no heat treatment hardening phenomenon.

However, austenitic stainless-steel is a kind of metastable stainless-steel, which is prone to lead to work hardening and precipitation phase transitions during producing and processing, resulting in increased material strength, reduced plasticity, reduced forming performance, and reduced corrosion resistance. To obtain austenitic stainless-steel with good corrosion resistance and strong plastic resilience, and to eliminate the hardening stress caused by pressure processing, in the current existing technology austenitic stainless-steel is mainly annealed after cold coiling to achieve softening. The commonly used annealing method is performed under an annealing temperature of 1050-1150° C. with a holding time of greater than 30 s, and then cooled to room temperature.

The annealing curve of high-strength structural carbon steel is diverse, and the annealing curve combined with the composition can achieve different strength grades from 780 MPa-1700 MPa, but due to the limitation of alloy content, austenitization temperature of the structural carbon steel is low, and the use of the same annealing and soaking temperature as austenitic stainless-steel will lead to grain coarseness. At the same time, the annealing curve of structural carbon steel contains a variety of controlled cooling requirements, unlike the rapid cooling process after the soaking of austenitic stainless-steels. This makes it difficult to obtain both mechanical performance and corrosion resistance through a single annealing of rolled clad steel plates comprising carbon steel layers and austenitic stainless-steel layers.

Based on the above, it is desired to provide a manufacturing method for a rolled clad plate of carbon steel and austenitic stainless-steel, which can adjust the structure and performance of carbon steel layer without changing the structure and performance of austenitic stainless-steel layer, thereby achieving the performance of high-strength carbon steel+austenitic stainless-steel rolled clad plate.

SUMMARY

One object of the present disclosure is to provide a manufacturing method for a rolled clad plate of carbon steel and austenitic stainless-steel, wherein the rolled clad plate of carbon steel and austenitic stainless-steel comprises an austenitic stainless-steel layer and a carbon steel layer that provides a basis of different specific mechanical properties for the overall steel plate at the same time, and the rolled clad plate of carbon steel and austenitic stainless-steel has different strength grades and excellent corrosion resistance.

To achieve the above object, the present disclosure proposes a manufacturing method for a rolled clad plate of carbon steel and austenitic stainless-steel comprising the following steps:

(1) preparing a blank material of a carbon steel layer and a blank material of a stainless-steel layer; (2) assembling the blank materials;

(3) clad rolling;

(4) cold rolling;

(5) first annealing: wherein the plate is annealed at an annealing temperature of 1050-1150° C. for a holding time of greater than or equal to 30 s; then cooled to room temperature, wherein in the cooling procedure, rapid cooling is performed in the temperature range of 900-500° C. with a cooling rate controlled to be 20-200° C./s;

(6) second annealing: wherein the plate is heated at a heating rate greater than or equal to 5° C./s to a soaking temperature of 800-950° C., held for 10-100 s, and then cooled at a rate of v1 =3-20° C./s, preferably 5-20° C./s to a rapid cooling starting temperature T of ≥800-10×v1, and then cooled at a rate of 20-1000° C./s to 150-450° C.; and then subjected to an overaging treatment, wherein the overaging temperature is 150-450° C. and the overaging treatment time is 100-400 s.

In the manufacturing method of the present disclosure, in step (5), the annealing temperature is set at 1050-1150° C.

because the solid solution annealing of austenitic stainless-steel between 1050-1150° C. can resolve the precipitated carbide. Then the plate is rapidly cooled to room temperature, due to the relative fast cooling rate of rapid cooling process, the solid soluble carbon has no time to precipitate in combination with other alloying elements, thereby improving its intergranular corrosion resistance. In addition, if the annealing temperature of austenitic stainless-steel is higher than 1150° C., the grain will become coarse and the grade of the grain size will be reduced, which will reduce the corrosion resistance of the strip steel.

Therefore, based on the above, the process parameters of step (5) are set as follows: the annealing temperature is 1050-1150° C., the holding time is greater than or equal to 30 s; then the plate is cooled to room temperature, during the cooling procedure, rapid cooling is performed in the temperature range of 900-500° C. with a cooling rate controlled to be 20-200° C./s. In some embodiments, the holding time in step (5) is 30-80 s. In some embodiments, the cooling rate in the temperature range of 900-500° C. is 20-180° C./s. In step (6), the soaking temperature at the second annealing is less than the austenitization temperature and greater than the upper limit of precipitation sensitive temperature of the stainless-steel layer, so it is set to be 800-950° C. Moreover, the slow cooling rate v1 is set to 3-20° C./s, in order to prevent carbides and σ phase precipitation, and then set to be cooled to 150-450° C. at a rate of 20-1000° C./s; and then the overaging treatment is carried out, wherein the overaging treatment time is 100-400 s, which is to avoid the re-precipitation of the carbide and 6 phases that have been solid solubilized. In some embodiments, the heating rate in step (6) is controlled to be 5-20° C./s.

Further, in the manufacturing method according to the present disclosure, in step (3), the blank materials are heated to 1100-1260° C. and held for more than 0.6 hours. The final rolling temperature is controlled to be greater than or equal to 850° C. The blank materials are cooled at a rate of 30-100° C./s after rolling and the coiling temperature is controlled to be 450-600° C. In some embodiments, in step (3), the holding time is 0.6 to 3 hours. In some embodiments, in step (3), the final rolling temperature is 850-920° C.

By research, the inventors of the present disclosure find that the lower the final rolling temperature, the higher the coiling temperature, and the more carbides and 6 phases precipitated at the grain boundary. In the case of other rolling process parameters being the same, lower final rolling temperatures and higher coiling temperatures are more likely to precipitate carbides, 6 phases, which is more likely to lead to intergranular corrosion. Therefore, it is necessary to control the final rolling temperature to be high and the coiling temperature to be low. However, it is impossible to stably control an excessively high final rolling temperature and an excessively low coiling temperature. Considering above, in the manufacturing method according to the present disclosure, the final rolling temperature is controlled to be greater than or equal to 850° C., the plate is rapidly cooled at a rate of 30-100° C./s after rolling and the coiling temperature is controlled to be 450-600° C.

Further, in the manufacturing method according to the present disclosure, in step (4), the cold rolling reduction rate is controlled to be 40-70%.

Further, the manufacturing method according to the present disclosure further comprises Step (7) of leveling.

Further, the blank material of the austenitic stainless-steel layer used for assembling the blank materials comprises the following chemical elements in mass percentages: C:

0.02%-0.15%, Si: 0.3%-1.0%, Mn: 1.0-10.5%, Cr: 14.0-20.0%, Ni: 0.2-14.0%, N≤0.25%, Cu≤0.6%, Mo≤3.0%; and a balance of Fe and other unavoidable impurities.

Further, the blank material of the carbon steel layer used for assembling the blank materials comprises the following chemical elements in mass percentages: C: 0.05%-0.35%, Si: 0.1%-2.0%, Mn: 0.5%-3.0%, Al: 0.01%-0.08%, and a balance of Fe and other unavoidable impurities. Further, the blank material of the carbon steel layer also comprises one or more elements of B, Nb, Ti, V, Cr and Mo; preferably, the weight percentage of each chemical element is: B≤0.005%, Nb≤0.1%, Ti≤0.15%, V≤0.15%, Cr≤0.6%, Mo≤0.3%. In some embodiments, the mass percentage of Ti is 0.01-0.15%.

Further, when assembling the blank materials, the thickness ratio of the carbon steel layer to each layer of the austenitic stainless-steel layers is 5-30:1, preferably 7-10:1.

In addition, the present disclosure also provides a rolled clad plate of carbon steel and austenitic stainless-steel manufactured by the above described manufacturing method.

It should be noted that in the technical solution of the present disclosure, the carbon steel layer is a base layer, the austenitic stainless-steel is a cladding layer, and the carbon steel layer can be single-side or double-side cladded with the cladding layer of austenitic stainless-steel.

Further, in the rolled clad plate of carbon steel and austenitic stainless-steel, the austenitic stainless-steel comprises the following chemical elements in mass percentages: C: 0.02%-0.15%, Si: 0.3%-1.0%, Mn: 1.0%-10.5%, Cr: 14.0-20.0%, Ni: 0.2-14.0%, N≤0.25%, Cu≤0.6%, Mo≤3.0%, and a balance of Fe and other unavoidable impurities.

In the rolled clad plate of carbon steel and austenitic stainless-steel according to the present disclosure, the design principles of each chemical element of the austenitic stainless-steel layer are as follows:

C: Carbon is the element for strongly forming, stabilizing and expanding the austenite phase region. C plays a key role in structure and strength of austenite at room temperature. Especially when the Ni content is relatively low, C plays a significant role in stabilizing the austenite structure. However, if the C content is too high, it will affect the plasticity and corrosion resistance of the steel. Therefore, the mass percentage of C in the austenitic stainless-steel layer of the rolled clad plate of carbon steel and austenitic stainless-steel according to the present disclosure is controlled to be 0.02 to 0.15%.

Si: Si is a ferrite forming element. If the Si content is too high, it will reduce the corrosion resistance of chromium-nickel austenitic stainless-steel and improve the sensitivity of steel to intergranular corrosion in the solid solution state, so in order to ensure that the steel is in austenitic structure at room temperature and it has corrosion resistance, it is necessary to control the Si content in the steel. However, in the smelting process of austenitic stainless-steel, Si is used as a deoxidizer, while the steel must contain a certain content of Si at the same time. Therefore, in the rolled clad plate of carbon steel and austenitic stainless-steel according to the present disclosure, the mass percentage of Si is controlled to be 0.3 to 1.0%.

Mn: Mn is a weak austenitic forming element, but in stainless-steel it is a strong austenitic stabilizing element. Moreover, Mn can significantly improve the solubility of N in steel. When the N content is high and the Ni content is low, a certain amount of Mn element is required. Part of Ni is replaced by the combination action of Mn, N and C to stabilize the austenite structure. However, Mn has a negative impact on the corrosion resistance of stainless-steel. If the content of Mn is too high, it will reduce the pitting corrosion resistance and crevice corrosion resistance of steel. Therefore, in the austenitic stainless-steel layer of the rolled clad plate of the carbon steel and austenitic stainless-steel according to the present disclosure, the mass percentage of Mn is controlled to be 1.0 to 10.5%.

Cr: Cr is the most important alloying element in stainless-steel and the most basic element to ensure the corrosion resistance of stainless-steel. With the increase of Cr content in steel, intergranular corrosion sensitivity of stainless-steel decreases and the strength increases, but the plasticity and cold forming performance may decrease. Meanwhile, if the amount of Cr is too high, it is required to cooperate with a corresponding high Ni equivalent to ensure the acquisition of room temperature austenite structure. Thus, for comprehensive consideration, the mass percentage of Cr in the austenitic stainless-steel layer of the rolled clad plate of carbon steel and austenitic stainless-steel according to the present disclosure is controlled to be 14.0 to 20.0%.

Ni: Ni is an important austenitic forming and stabilizing element, which can promote the stability of a passivation film of stainless-steel, reduce the ductile-brittle transition temperature, and improve the cold formability and weldability. Ni is also an expensive element, which has an important impact on the cost of austenitic stainless-steel. Therefore, the mass percentage of Ni in the austenitic stainless-steel layer of the rolled clad plate of carbon steel and austenitic stainless-steel according to the present disclosure is controlled to be 0.2 to 14.0%.

N: N is a very strong element to form, stabilize and expand the austenitic phase zone in austenitic stainless-steel. Through solid solution strengthening effect, N can significantly improve the strength of austenitic stainless-steel at room temperature and high temperature, and does not significantly reduce the plasticity and toughness of the steel, meanwhile, N can improve acid corrosion resistance and local corrosion resistance of austenitic stainless-steel. Due to the limited solubility of N in stainless-steel, in order to avoid subsurface blowholes during the solidification process, N must coordinate with other elements to ensure its presence in a solid solution state. For comprehensive consideration of the mass percentages of Mn, C and other alloying elements of the present disclosure, in the austenitic stainless-steel layer of the rolled clad plate of carbon steel and austenitic stainless-steel according to the present disclosure, N is controlled to be ≤0.25%.

Cu: Cu can improve the stainlessness and corrosion resistance of austenitic stainless-steel, especially in a reducing media such as sulfuric acid. Cu can significantly reduce the strength of stainless-steel and cold work hardening tendency. However, when Cu is added, the chromium-manganese austenitic stainless-steel comprising Mn and N instead of Ni has a much lower delayed fracture sensitivity than that of chromium-nickel austenitic stainless-steel, and the thermoplasticity of austenitic stainless-steel decreases with the increase of Cu content in the steel. Therefore, the mass percentage of Cu in the austenitic stainless-steel layer of the rolled clad plate of carbon steel and austenitic stainless-steel according to the present disclosure is controlled to be ≤0.6%.

Mo: The addition of Mo element can greatly increase the corrosion resistance and high temperature strength of austenitic stainless-steel. Especially the austenitic stainless-steel has a resistance to high temperature of 1200-1300 degrees and thus can be used under harsh conditions. Therefore, the mass percentage of Mo in the austenitic stainless-steel layer of the rolled clad plate of carbon steel and austenitic stainless-steel according to the present disclosure is controlled to be ≤3.0%.

In the rolled clad plate of carbon steel and austenitic stainless-steel according to the present disclosure, the unavoidable impurity elements should be controlled as low as possible, but considering the limit by process level and manufacturing cost, the mass percentage of unavoidable elements such as P and S is controlled to be in the range of P≤0.035% and S≤0.015%. P is an impurity element in steel, which has an adverse impact on the plasticity, toughness and corrosion resistance of stainless-steel, and its content should be reduced as much as possible in production. Therefore, the mass percentage of P in the austenitic stainless-steel layer of the rolled clad plate of carbon steel and austenitic stainless-steel according to the present disclosure is controlled to be P≤0.035%. S is an impurity element in steel, which has harmful effects on the high temperature plasticity, toughness and corrosion resistance of steel, and its content should be reduced as much as possible in production. Therefore, the mass percentage of S in the austenitic stainless-steel layer of the rolled clad plate of carbon steel and austenitic stainless-steel according to the present disclosure is controlled to be S≤0.015%.

Further, in the rolled clad plate of carbon steel and austenitic stainless-steel according to the present disclosure, the carbon steel layer comprises the following chemical elements in mass percentages:

C: 0.05%-0.35%, Si: 0.1%-2.0%, Mn: 0.5%-3.0%, Al: 0.01%-0.08%, and a balance of Fe and other unavoidable impurities.

C: The addition of C element plays a key role in increasing the strength of the steel, ensuring that a bainite or martensitic phase transition occurs to produce phase transition reinforcement. C and alloying elements precipitate fine dispersed metal carbides to provide fine crystal strengthening and precipitation strengthening. However, considering the weldability of the rolled clad plate of carbon steel and austenitic stainless-steel according to the present disclosure, the mass percentage of C in the carbon steel layer of the rolled clad plate of carbon steel and austenitic stainless-steel according to the present disclosure is controlled to be 0.05%-0.35%.

Si: Si is an element for strengthening ferrite, which can effectively increase the strength of ferrite. In addition, Si is a non-carbide forming element. Si can strongly inhibit the formation of $Fe_3C$ in the isothermal process to enrich carbon in untransformed austenite, thereby greatly improving the stability of austenite, so that it can be retained at room temperature to produce a TRIP effect. Therefore, the mass percentage of Si in the rolled clad plate of carbon steel and austenitic stainless-steel according to the present disclosure is controlled to be 0.1%-2.0%.

Mn: Mn is a carbide-forming element, which can drag carbon through solid solution, thereby delaying the pearlite transformation, lowering the Bs point, inhibiting the bainite phase transition, and playing an important role in the window interval of martensitic formation. The addition of Mn reduces the martensitic transition temperature and increases the content of residual austenite, meanwhile, Mn has little effect on the toughness of steel plate. When 1.5% to 2.5% by mass of Mn is comprised in the steel, the resistance to residual austenite decomposition can be effectively improved. However, due to the fact that Mn has more reductions on Ms points and adversely affects the weldability, the content should be appropriate. Therefore, the mass percentage of Mn in the carbon steel layer of the rolled clad plate of carbon steel and austenitic stainless-steel according to the present disclosure is controlled to be 0.5%-3.0%.

Al: The addition of Al plays a role in deoxygenation and refining grains. Like Si, Al is also a non-carbide-forming element that strongly inhibits the formation of $Fe_3C$ and enriches carbon in untransformed austenite. Although the solid solution strengthening effect of Al is weaker than Si, in the technical solution of the present disclosure, the Al element may be added to reduce the side effects of silicon. Therefore, the mass percentage of Al in the carbon steel layer of the rolled clad plate of carbon steel and austenitic stainless-steel according to the present disclosure is controlled to be 0.01%-0.08%.

Further, in the rolled clad plate of carbon steel and austenitic stainless-steel according to the present disclosure, the carbon steel layer also comprises at least one of the following chemical elements: B≤0.005%, Nb≤0.1%, Ti≤0.15%, V≤0.15%, Cr≤0.6%, Mo≤0.3%.

B: Boron can improve the hardenability of steel, and the reason for improving the hardenability of steel is that in the process of austenite transformation, the nucleation of the new phase (referring to ferrite) is most likely to occur at the grain boundary. However, when the boron content of steel is higher than 0.005%, the phenomenon of thermal brittleness occurs. Therefore, the mass percentage of B in the carbon steel layer of the rolled clad plate of carbon steel and austenitic stainless-steel according to the present disclosure is controlled to be B≤0.005%.

Nb: In the control of rolling process, the strain-induced precipitation phase of Nb significantly reduces the recrystallization temperature of deformed austenite through the action of mass point pinning and sub-grain boundary, providing nucleation of mass point, which has obvious effect on the refinement of grains. Therefore, the mass percentage of Nb in the carbon steel layer of the rolled clad plate of carbon steel and austenitic stainless-steel according to the present disclosure is controlled to be Nb≤0.1%.

Ti: Ti is the main compound element of Ti—Mo—C nano-precipitates, and Ti also shows a strong effect of inhibiting the growth of austenite grains at high temperatures, thereby refining grains. Therefore, the mass percentage of Ti in the carbon steel layer of the rolled clad plate of carbon steel and austenitic stainless-steel according to the present disclosure is controlled to be Ti≤0.15%. In some embodiments, the mass percentage of Ti is 0.01-0.15%.

V: After the occurrence of controlled rolling phase transitions, the residual V in austenite further precipitates in the ferrite, producing a significant precipitation strengthening effect.

Therefore, the mass percentage of V in the carbon steel layer of the rolled clad plate of carbon steel and austenitic stainless-steel according to the present disclosure is controlled to be V≤0.15%.

Cr: Mn and Cr are both carbide-forming elements that can be interchanged to guarantee strength when considering hardenability. However, the addition of Cr can effectively delay the pearlite transformation, shift the bainite phase transition region to the left, and have a smaller lowering effect on the Ms point than Mn. However, in low-carbon steel, too much carbon nitride forming elements such as Nb, Ti, V will affect the subsequent phase transition, so the upper limit of alloying element content needs to be controlled. Cr, Mo and other elements that improve hardenability will lead to a decrease in weldability performance after reaching a certain amount, so it is also necessary to control their upper limits. Therefore, the mass percentage of Cr in the carbon steel layer of the rolled clad plate of carbon steel and austenitic stainless-steel according to the present disclosure is controlled to be Cr≤0.6%.

Mo: Mo can significantly improve hardenability. Mo significantly delays pearlite transformation by dragging carbon through solid solution, but has less effect on the precipitation delay of pre-precipitated ferrite. The effect of Mo on the reduction of Bs points is greater than that of Cr and less than that of Mn, so its sub-stabilizing effect on austenite is also greater than that of Cr. In addition, Mo is the most important chemical element that affects the production of nano-precipitates. Mo can improve the solid solubility of Ti (C, N) in austenite and retain a large amount of Ti in the solid solution, so that Ti can be diffused and precipitated in the low temperature transformation, resulting in higher strengthening effect.

In low-carbon steel, too much carbon nitride forming elements such as Nb, Ti, V will affect the subsequent phase transition, so the upper limit of alloying element content needs to be controlled. Cr, Mo and other elements that improve hardenability will lead to a decrease in weldability performance after reaching a certain amount, so it is also necessary to control their upper limit. Therefore, the mass percentage of Mo in the carbon steel layer of the rolled clad plate of carbon steel and austenitic stainless-steel according to the present disclosure is controlled to be Mo≤0.3%.

Further, in the rolled clad plate of carbon steel and austenitic stainless-steel according to the present disclosure, the rolled clad plate of carbon steel and austenitic stainless-steel has a tensile strength of 780-1710 MPa, such as 780-1700 MPa. Further, the rolled clad plate of carbon steel and austenitic stainless-steel according to the present disclosure has a yield strength of 500-1400 MPa. Further, the rolled clad plate of carbon steel and austenitic stainless-steel according to the present disclosure has a pitting corrosion potential of 0.25-0.45V, such as 0.29-0.42V, and an intergranular corrosion of 0.25-0.40 Ra.

The manufacturing method of the rolled clad plate of carbon steel and austenitic stainless-steel according to the present disclosure have the following advantages and beneficial effects as compared with the prior art:

The rolled clad plate of carbon steel and austenitic stainless-steel according to the present disclosure comprises an austenitic stainless-steel layer and a carbon steel layer that provides a basis of different specific mechanical properties for the overall steel plate at the same time, so that the final steel plate has different strength grades of from 780 MPa to 1700 MPa and excellent corrosion resistance.

DETAILED DESCRIPTION

The present disclosure will be further described with reference to the specific embodiments of the rolled clad plate of carbon steel and austenitic stainless-steel according to the present disclosure and the manufacturing method thereof to make a further explanation and description, however, the explanation and description does not constitute an improper limitation of the technical solution of the present disclosure.

EXAMPLES 1-6

The rolled clad plates of carbon steel and austenitic stainless-steel of Example 1-6 were prepared by the following steps:

(1) preparing a blank material of carbon steel layer and a blank material of a stainless-steel layer according to the composition shown in Table 1;

(2) assembling the blank materials;

(3) clad rolling: wherein the blank materials were heated to 1150-1260° C. and held for 0.6 hour or more, wherein the final rolling temperature was controlled to be greater than or equal to 850° C., the blank materials were cooled at a rate of 30-100° C./s after rolling and the coiling temperature was controlled to be 450-600° C.;

(4) cold rolling: wherein the cold rolling reduction rate was controlled to be 40-70%;

(5) first annealing: wherein the plate was annealed at an annealing temperature of 1050-1150° C. and a holding time of greater than or equal to 30 s; then cooled to room temperature, wherein in the cooling procedure, rapid cooling was performed in the temperature range of 900-500° C. with a cooling rate controlled to be 20-200° C./s;

(6) second annealing: wherein the plate was heated at a heating rate greater than or equal to 5° C./s to a soaking temperature of 800-950° C., held for 10-100 s, and then cooled at a rate of $v1 = 3\text{-}20°$ C./s, preferably 5-20° C./s to a rapid cooling starting temperature T of $>800\text{-}10xv1$, and then cooled at a rate of 20-1000° C./s to 150-450° C.; and then subjected to an overaging treatment, wherein the overaging temperature was 150-450° C. and the overaging treatment time was 100-400 s.

In some other embodiments, the manufacturing method also comprised Step (7) of leveling.

The mass percentages of each chemical element of the rolled clad plate of carbon steel and austenitic stainless-steel of Example 1-6 are shown in Table 1.

TABLE 1

| | | | | | | | | | |
|---|---|---|---|---|---|---|---|---|---|
| (wt %, with a balance of Fe and other unavoidable impurities) | | | | | | | | | |
| No. | Blank layer | C | Si | Mn | P | S | N | Al | B |
| Example 1 | Carbon steel layer | 0.348 | 0.32 | 0.52 | 0.0082 | 0.0015 | 0.0036 | 0.034 | 0.0028 |
| | 304L austenitic stainless-steel layer | 0.023 | 0.32 | 1.32 | 0.0239 | 0.0019 | 0.052 | — | — |
| Example 2 | Carbon steel layer | 0.199 | 0.109 | 1.58 | 0.0093 | 0.001 | 0.0035 | 0.028 | 0.0017 |
| | BN1H austenitic stainless-steel layer | 0.147 | 0.96 | 10.23 | 0.029 | 0.0012 | 0.24 | — | — |
| Example 3 | Carbon steel layer | 0.098 | 0.26 | 2.28 | 0.0067 | 0.001 | 0.003 | 0.0249 | — |
| | 304 austenitic stainless-steel layer | 0.045 | 0.42 | 1.24 | 0.032 | 0.0009 | 0.042 | — | — |
| Example 4 | Carbon steel layer | 0.058 | 0.226 | 1.358 | 0.0104 | 0.003 | 0.0035 | 0.0775 | 0.0047 |
| | 304 austenitic stainless-steel layer | 0.045 | 0.42 | 1.24 | 0.032 | 0.0009 | 0.042 | — | — |
| Example 5 | Carbon steel layer | 0.182 | 1.9 | 1.82 | 0.0104 | 0.003 | 0.0035 | 0.0375 | — |
| | 316 austenitic stainless-steel layer | 0.0776 | 0.69 | 1.92 | 0.0278 | 0.0012 | 0.098 | — | — |
| Example 6 | Carbon steel layer | 0.12 | 0.35 | 2.91 | 0.0092 | 0.001 | 0.0028 | 0.024 | — |
| | 316L austenitic stainless-steel layer | 0.0216 | 0.48 | 1.42 | 0.0326 | 0.0021 | 0.058 | — | — |

| No. | Blank layer | Ni | Nb | Ti | V | Cr | Cu | Mo |
|---|---|---|---|---|---|---|---|---|
| Example 1 | Carbon steel layer | — | — | 0.025 | — | — | — | — |
| | 304L austenitic stainless-steel layer | 8.19 | — | — | — | 18.3 | — | — |
| Example 2 | Carbon steel layer | — | — | 0.012 | — | — | — | 0.11 |
| | BN1H austenitic stainless-steel layer | 0.23 | — | — | — | 15.7 | 0.56 | — |
| Example 3 | Carbon steel layer | — | — | 0.021 | — | 0.55 | — | 0.22 |
| | 304 austenitic stainless-steel layer | 8.08 | — | — | — | 19.71 | — | — |
| Example 4 | Carbon steel layer | — | 0.095 | 0.1439 | 0.13 | — | — | — |
| | 304 austenitic stainless-steel layer | 8.08 | — | — | — | 19.71 | — | — |
| Example 5 | Carbon steel layer | — | — | 0.012 | — | — | — | — |
| | 316 austenitic stainless-steel layer | 13.86 | — | — | — | 17.8 | — | 2.05 |
| Example 6 | Carbon steel layer | — | — | 0.015 | — | — | — | — |
| | 316L austenitic stainless-steel layer | 10.06 | — | — | — | 16.3 | — | 2.88 |

The specific process parameters of the rolled clad plate of carbon steel and austenitic stainless-steel of Example 1-6 are shown in Table 2-1 and Table 2-2.

TABLE 2-1

| No. | Step(2) (thickness ratio of Austenitic stainless-steel layer:Carbon steel layer:Austenitic stainless-steel layer) | Step(3) | | Step(4) Cold rolling reduction rate (%) | Step(5) | | |
|---|---|---|---|---|---|---|---|
| | | Heating temperature (° C.) | Holding time (h) | Final rolling temperature (° C.) | Cooling rate (° C./s) | Coiling temperature (° C.) | |
| Example 1 | 0:10:1 | 1170 | 0.6 | 900 | 100 | 520 | 60 |
| Example 2 | 1:10:1 | 1230 | 1.3 | 920 | 70 | 550 | 40 |
| Example 3 | 1:8:1 | 1200 | 3 | 860 | 50 | 580 | 50 |
| Example 4 | 0:8.5:1 | 1230 | 2.5 | 880 | 30 | 600 | 70 |
| Example 5 | 1:5:1 | 1260 | 1.5 | 850 | 60 | 450 | 55 |
| Example 6 | 1:9:1 | 1150 | 2 | 890 | 80 | 500 | 45 |
| Example 7 | 0:30:1 | 1150 | 2 | 890 | 80 | 500 | 45 |
| Example 8 | 1:20:1 | 1150 | 2 | 890 | 80 | 500 | 45 |

| No. | Step(5) | | |
|---|---|---|---|
| | Annealing temperature (° C.) | Holding time (s) | Rapid cooling rate in the temperature range of 900-500° C. (° C./s) |
| Example 1 | 1050 | 80 | 20 |
| Example 2 | 1080 | 70 | 25 |
| Example 3 | 1100 | 60 | 180 |
| Example 4 | 1120 | 50 | 120 |
| Example 5 | 1130 | 40 | 35 |
| Example 6 | 1150 | 30 | 30 |
| Example 7 | 1150 | 30 | 30 |
| Example 8 | 1150 | 30 | 30 |

Note: the compositions of blank layer of Examples 7 and 8 are the same as those of Examples 1 and 2; in each Example, the thickness of each layer is recorded in unit of mm.

TABLE 2-2

| No. | Step (6) | | | | | | | | |
|---|---|---|---|---|---|---|---|---|---|
| | Heating rate (° C./s) | Soaking temperature (° C.) | Holding time (s) | v1 (° C./s) | Rapid cooling starting temperature (° C.) | Rapid cooling rate (° C./s) | Rapid cooling ending temperature (° C.) | Overaging temperature (° C.) | Overaging time (s) |
| Example 1 | 5 | 850 | 55 | 3 | 780 | 500 | 210 | 210 | 240 |
| Example 2 | 8 | 835 | 40 | 6 | 750 | 1000 | 150 | 150 | 400 |
| Example 3 | 10 | 820 | 30 | 9 | 720 | 70 | 320 | 320 | 180 |
| Example 4 | 12 | 800 | 10 | 10 | 710 | 20 | 450 | 450 | 100 |
| Example 5 | 15 | 900 | 70 | 15 | 700 | 100 | 200 | 400 | 200 |
| Example 6 | 20 | 950 | 90 | 20 | 700 | 200 | 240 | 280 | 240 |
| Example 7 | 5 | 850 | 55 | 3 | 780 | 500 | 210 | 210 | 240 |
| Example 8 | 8 | 835 | 40 | 6 | 750 | 1000 | 150 | 150 | 400 |

In order to verify the implementation effect of the present disclosure and prove the excellent effect of the present disclosure compared with the prior art, the rolled clad plates of carbon steel and austenitic stainless-steel of Example 1-6 according to the present disclosure were tested, and the test results were listed in Table 3.

According to Table 3, it can be seen that the rolled clad plate of carbon steel and austenitic stainless-steel of each Example according to the present disclosure has a tensile strength of 802-1710 MPa, a yield strength of 514-1390 MPa, an elongation of 7.3-15.4%. The pitting corrosion was tested according to GB/T 17899-1999 stainless-steel pitting corrosion potential measurement method, and the intergranular corrosion performance was tested in accordance with ASTM G108-94. As can be seen from Table 3, each Example according to the present disclosure has a pitting

TABLE 3

| No. | Mechanical tensile properties | | | Corrosion | |
|---|---|---|---|---|---|
| | Tensile strength (MPa) | Yield strength (MPa) | Elongation (%) | Pitting corrosion potential (V) | Intergranular corrosion (Ra) |
| Example 1 | 1710 | 1390 | 7.3 | 0.31 | 0.29 |
| Example 2 | 1128 | 808 | 10.8 | 0.29 | 0.26 |
| Example 3 | 968 | 514 | 15.2 | 0.31 | 0.39 |
| Example 4 | 802 | 786 | 10.6 | 0.32 | 0.4 |
| Example 5 | 1188 | 987 | 15.4 | 0.42 | 0.36 |
| Example 6 | 1304 | 1171 | 8.6 | 0.41 | 0.29 |
| Example 7 | 1690 | 1375 | 7.5 | 0.31 | 0.28 |
| Example 8 | 1120 | 795 | 11.0 | 0.30 | 0.27 | corrosion potential of 0.29-0.42 V, and an intergranular corrosion of 0.26-0.4 Ra, indicating that the corrosion resistance of each Example according to the present disclosure is excellent.

Based on the above, the rolled clad plate of carbon steel and austenitic stainless-steel manufactured by the method of the present disclosure comprises an austenitic stainless-steel layer that guarantees corrosion resistance energy and a carbon steel layer that provides a basis of different specific mechanical properties for the overall steel plate at the same time, so that the final steel plate has different strength grades of from 780 MPa to 1700 MPa and excellent corrosion resistance.

It's to be noted that the prior art portions in the protection scope of the present disclosure are not limited to the examples set forth in the present application document. All the prior art contents not contradictory to the technical solution of the present disclosure, including but not limited to prior patent literatures, prior publications, prior public uses and the like, may all be incorporated into the protection scope of the present disclosure.

In addition, the ways in which the various technical features of the present disclosure are combined are not limited to the ways recited in the claims of the present disclosure or the ways described in the specific examples. All the technical features recited in the present disclosure may be combined or integrated freely in any manner, unless contradictions are resulted.

It should also be noted that the examples set forth above are only specific examples according to the present disclosure. Obviously, the present disclosure is not limited to the above examples. Similar variations or modifications made thereto can be directly derived or easily contemplated from the present disclosure by those skilled in the art. They all fall in the protection scope of the present disclosure.

What is claimed is:

1. A manufacturing method for a rolled clad plate of carbon steel and austenitic stainless-steel, characterized in that, it comprises the following steps:
   (1) preparing a blank material of a carbon steel layer and a blank material of a stainless-steel layer;
   (2) assembling the blank materials;
   (3) clad rolling;
   (4) cold rolling;
   (5) first annealing: wherein the plate is annealed at an annealing temperature of 1050-1150° C. and a holding time of greater than or equal to 30s; then cooled to room temperature, wherein in a cooling procedure, rapid cooling is performed in a temperature range of 900-500° C. with a cooling rate controlled to be 20-200° C./s;
   (6) second annealing: wherein the plate is heated at a heating rate greater than or equal to 5° C./s to a soaking temperature of 800-950° C., held for 10-100s, and then cooled at a rate of v1=3-20° C./s to a rapid cooling starting temperature T of ≥800-10xv1, and then cooled at a rate of 20-1000° C./s to 150-450° C.; and then subjected to an overaging treatment, wherein a overaging temperature is 150-450° C. and the overaging treatment time is 100-400s.

2. The manufacturing method according to claim 1, wherein, in step (3), the blank materials are heated to 1150-1260° C. and held for 0.6 hour or more, wherein a final rolling temperature is controlled to be greater than or equal to 850° C., the blank materials are cooled at a rate of 30-100° C./s after rolling and a coiling temperature is controlled to be 450-600° C.

3. The manufacturing method according to claim 1, wherein, in step (4), a cold rolling reduction rate was controlled to be 40-70%.

4. The manufacturing method according to claim 1, wherein the method further comprises step (7) of leveling.

5. The manufacturing method according to claim 1, wherein, in step (5), a holding time is 30-80s and the cooling rate in the temperature range of 900-500° C. is 20-180° C./s.

6. The manufacturing method according to claim 1, wherein, in step (6), the heating rate is 5-20° C./s, v1=5-20° C./s.

7. The manufacturing method according to claim 2, wherein, in step (3), a holding time is 0.6-3 hours, and a final rolling temperature is 850-920° C.

8. The manufacturing method according to claim 1, wherein the carbon steel layer is a base layer, the austenitic stainless-steel is a cladding layer, and the carbon steel layer is single-side or double-side cladded with the cladding layer of austenitic stainless-steel.

9. The manufacturing method according to claim 1, wherein, when assembling the blank materials, a thickness ratio of the carbon steel layer to each layer of austenitic stainless-steel layers is 5-30:1.

10. The manufacturing method according to claim 1, wherein, when assembling the blank materials, a thickness ratio of the carbon steel layer to each layer of austenitic stainless-steel layers is 7-10:1.

11. A rolled clad plate of carbon steel and austenitic stainless-steel manufactured by the manufacturing method according to claim 1;
   wherein the rolled clad plate of carbon steel and austenitic stainless-steel has a tensile strength of 780-1700 MPa;
   wherein the rolled clad plate of carbon steel and austenitic stainless-steel has a yield strength of 500-1400 MPa, a pitting corrosion potential of 0.25-0.45 V, and an intergranular corrosion of 0.25-0.40 Ra.

12. The rolled clad plate of carbon steel and austenitic stainless-steel according to claim 11, characterized in that, the austenitic stainless-steel layer comprises the following chemical elements in mass percentages: C: 0.02%- 0.15%, Si: 0.3%- 1.0%, Mn: 1.0-10.5%, Cr: 14.0-20.0%, Ni: 0.2-14.0%, N≤0.25%, Cu≤0.6%, Mo≤3.0%; and a balance of Fe and other unavoidable impurities.

13. The rolled clad plate of carbon steel and austenitic stainless-steel according to claim 11, wherein the carbon steel layer comprises the following chemical elements in mass percentages:
   C: 0.05%- 0.35%, Si: 0.1%- 2.0%, Mn: 0.5%- 3.0%, Al: 0.01%- 0.08%, and a balance of Fe and other unavoidable impurities.

14. The rolled clad plate of carbon steel and austenitic stainless-steel according to claim 13, wherein the carbon steel layer further comprises at least one of the following chemical elements: B≤0.005%, Nb≤0.1%, Ti≤0.15%, V≤0.15%, Cr≤0.6%, Mo≤0.3%.

15. The rolled clad plate of carbon steel and austenitic stainless-steel according to claim 12, wherein the rolled clad plate of carbon steel and austenitic stainless-steel has a tensile strength of 780-1700 MPa.

16. The rolled clad plate of carbon steel and austenitic stainless-steel according to claim 13, wherein the rolled clad plate of carbon steel and austenitic stainless-steel has a tensile strength of 780-1700 MPa.

17. The rolled clad plate of carbon steel and austenitic stainless-steel according to claim 14, wherein the rolled clad plate of carbon steel and austenitic stainless-steel has a tensile strength of 780-1700 MPa.

* * * * *